US008174630B2

(12) United States Patent
Hsu et al.

(10) Patent No.: US 8,174,630 B2
(45) Date of Patent: May 8, 2012

(54) REFLECTIVE LIQUID CRYSTAL DISPLAY PANEL CAPABLE OF BEING PHOTO-PROGRAMMED AND RESTORED BY POLARIZED LIGHTS

(75) Inventors: Wei-Ting Hsu, Tainan County (TW); Tsung-Hsien Lin, Hsinchu (TW); Hsing-Lung Wang, Taoyuan County (TW); Chi-Chang Liao, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 610 days.

(21) Appl. No.: 11/459,934

(22) Filed: Jul. 26, 2006

(65) Prior Publication Data

US 2007/0195234 A1 Aug. 23, 2007

(30) Foreign Application Priority Data

Feb. 21, 2006 (TW) ................................ 95105727 A

(51) Int. Cl.
*G02F 1/13* (2006.01)
*G02F 1/135* (2006.01)
*G02F 1/1335* (2006.01)
*C09K 19/52* (2006.01)
*C09K 19/02* (2006.01)

(52) U.S. Cl. ................ 349/2; 349/25; 349/96; 349/113; 349/163; 349/186; 349/188

(58) Field of Classification Search ..................... 349/24, 349/29, 30, 2, 3, 25, 96, 98, 113, 114, 116, 349/163, 186, 188
See application file for complete search history.

(56) References Cited

U.S. PATENT DOCUMENTS

| 4,664,480 | A | * | 5/1987 | Geary et al. ................... 349/128 |
| 4,799,776 | A | * | 1/1989 | Yamazaki et al. ............. 349/113 |
| 4,963,448 | A | * | 10/1990 | Ichimura et al. ................ 430/20 |
| 6,141,075 | A | * | 10/2000 | Ohmuro et al. ............... 349/130 |
| 6,831,719 | B2 | * | 12/2004 | Jang et al. ..................... 349/114 |

OTHER PUBLICATIONS

Control of an Easy-Axis on Nematic-Polymer Interface by Light Action to Nematic Bulk, Voloshchenko et al., Institute of Physics, Academy of Sciences of Ukraine, 46 Prospect Nauki, Kiev-22, Ukraine 252650, p. 566-571.

(Continued)

*Primary Examiner* — Mark Robinson
*Assistant Examiner* — Paisley L Arendt
(74) *Attorney, Agent, or Firm* — Jianq Chyun IP Office

(57) ABSTRACT

A reflective liquid crystal display panel capable of performing data programming and/or data erasing via a polarized light is provided. The reflective liquid crystal display panel includes a first substrate, a second substrate, a liquid crystal layer, a transflective film, a retarder and a polarizer. The second substrate is disposed over the first substrate. The liquid crystal layer is located between the first substrate and the second substrate and an optical aligned material is doped in the liquid crystal layer. The transflective film is disposed below the first substrate, and the transflective film allows the polarized light to pass through, so that the orientation of the optical aligned material doped liquid crystal layer can be controlled by the polarized light. The transflective film reflects external light source. The retarder is disposed between the transflective film and the first substrate. The polarizer is disposed on the second substrate.

19 Claims, 5 Drawing Sheets

OTHER PUBLICATIONS

Effects of light on molecular orientation of liquid crystals, F Simoni and O Francescangeli, Diparimento di Scienze dei Materiali e dela Terra and Istituto Nazionale per la Fisica della Materia, Universita di Ancona, Via Breece Bianche I-60131, Ancona, Italy, R439-487.

Dynamic studies of holographic gratings in dye-doped liquid-crystal films, Andy Y.-G. Fuh, et. al., Nov. 15, 2001, vol. 26, No. 22, Optics Letters, p. 1767-1769.

Electrically switchable and thermally erasable biphotonic holographic gratings in dye-doped liquid crystal films, C.-R. Lee, et. al., Nov. 24, 2003, vol. 83, No. 21, Applied Physics Letters, p. 4285-4287.

Surface-assisted photoalignment in dye-doped liquid-crystal films, C.-R. Lee, et. al., Physical Review E 69, 031704 (2004).

50.2: Cholesteric Liquid Crystal Micro-Capsules with a Perpendicular Alignment Shell for Photo-Addressable Electronic Paper, N. Hiji et. al., SID 05 Digest, p. 1560-1563.

* cited by examiner

REFLECTIVE LIQUID CRYSTAL DISPLAY PANEL CAPABLE OF BEING PHOTO-PROGRAMMED AND RESTORED BY POLARIZED LIGHTS

CROSS-REFERENCE TO RELATED APPLICATION

This application claims the priority benefit of Taiwan application serial no. 95105727, filed Feb. 21, 2006. All disclosure of the Taiwan application is incorporated herein by reference.

BACKGROUND OF THE INVENTION

1. Field of Invention

The present invention relates to a reflective liquid crystal display (LCD) panel. More particularly, the present invention relates to a reflective LCD panel capable of performing data programming and/or erasing via a polarized light.

2. Description of Related Art

Generally, thin film transistor liquid crystal displays (TFT-LCD) can be divided into transmissive, reflective, and transflective LCDs according to the utilization of light source and the difference in TFT array. Wherein, the transmissive TFT-LCD uses back-light as its light source, and the pixel electrodes on the TFT array substrate thereof are transmissive electrodes, so that light can pass through; the reflective TFT-LCD uses front-light or external light as its light source, and the pixel electrodes on the TFT array substrate thereof are reflective electrodes of metal or other reflective materials, so that the front-light or external light can be reflected; and the transflective TFT-LCD is the integrated structure of transmissive TFT-LCD and reflective TFT-LCD, which can use both back-light and front-light or external light for displaying.

Generally, the transmissive LCD panel, the reflective LCD panel, and the transflective LCD panel are all integrated with driving circuit (for example, driver IC, control circuit board, image processor etc) for displaying images. In particular, in the conventional transmissive, reflective, and transflective LCD panels, the orientation of the liquid crystal layer is controlled by the bias between pixel electrode and common electrode, and the voltage input to each pixel electrode is provided by a driving circuit. Thus, the manufacturing cost of the conventional LCD (including LCD panel and driving circuit) can not be further reduced.

Recently, many electronic products with image memory displaying function, such as electronic paper, electronic kanban, smart card etc are invented. Since the images to be displayed by these electronic products are usually static images which can stay for certain time period, constant data updating is not necessary, so that power consumption thereof is reduced. In addition to the power consumption performance, how to write data into the display media through external field (for example, electric field, magnetic field, light field etc) has become today's major subject. Moreover, how to manufacture displays with lower cost and better display quality is also one of the most important subjects.

SUMMARY OF THE INVENTION

Accordingly, the present invention is directed to provide a reflective liquid crystal display (LCD) panel which does not need driving circuit and is suitable for electronic products such as electronic paper, electronic kanban, and smart card.

To achieve the aforementioned and other objectives of the present invention, a reflective LCD panel is provided, which is suitable for performing data programming and/or erasing via a polarized light. The reflective LCD panel includes a first substrate, a second substrate, a liquid crystal layer, a transflective film, a retarder, and a polarizer. The second substrate is disposed over the first substrate. The liquid crystal layer is disposed between the first substrate and the second substrate, and the liquid crystal layer is doped with an optical aligned material. The transflective film is disposed below the first substrate, and the transflective film allows the polarized light to pass through so as to control the orientation of the optical aligned material doped liquid crystal layer. The transflective film reflects the external light. The retarder is disposed between the transflective film and the first substrate. The polarizer is disposed on the second substrate.

In an embodiment of the present invention, the polarized light used for performing data programming to the liquid crystal layer is linear polarized light, and the polarized light used for performing data erasing to the liquid crystal layer is circular polarized light.

In an embodiment of the present invention, the first substrate is a flexible substrate or a rigid substrate.

In an embodiment of the present invention, the second substrate is a flexible substrate or a rigid substrate.

In an embodiment of the present invention, the optical aligned material is Azo dye or Azo polymer.

In an embodiment of the present invention, the optical aligned material is evenly distributed in the liquid crystal layer.

In an embodiment of the present invention, the optical aligned material is distributed in the lower part of the liquid crystal layer.

In an embodiment of the present invention, the optical aligned material is distributed in the upper part of the liquid crystal layer.

In an embodiment of the present invention, the liquid crystal layer represents twisted nematic mode orientation or mixed-mode twisted nematic orientation after being irradiated by the polarized light.

In an embodiment of the present invention, the retarder is a quarter wave plate.

In an embodiment of the present invention, the retarder has an optical axis, the polarizer has an absorption axis, and the optical axis makes an angle of 45° with the absorption axis.

In an embodiment of the present invention, the retarder has an optical axis, the polarizer has an absorption axis, and the optical axis makes an angle of 90° with the absorption axis.

In an embodiment of the present invention, the reflective LCD panel may further include an upper alignment layer, wherein the upper alignment layer is disposed on the second substrate and between the second substrate and the liquid crystal layer.

In an embodiment of the present invention, the reflective LCD panel may further include a polymer layer, wherein the polymer layer is disposed on the first substrate and between the first substrate and the liquid crystal layer.

In an embodiment of the present invention, the polymer layer is a lower alignment layer, and the aligning capability of the lower alignment layer to the liquid crystal layer is smaller than that of the upper alignment layer to the liquid crystal layer.

An optical aligned material doped liquid crystal layer is adopted in the reflective LCD panel of the present invention, thus, the data can be programmed into the liquid crystal layer or erased from the liquid crystal layer via a polarized light. Accordingly, the reflective LCD panel in the present invention does not need a driving circuit for displaying and updating images.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1:
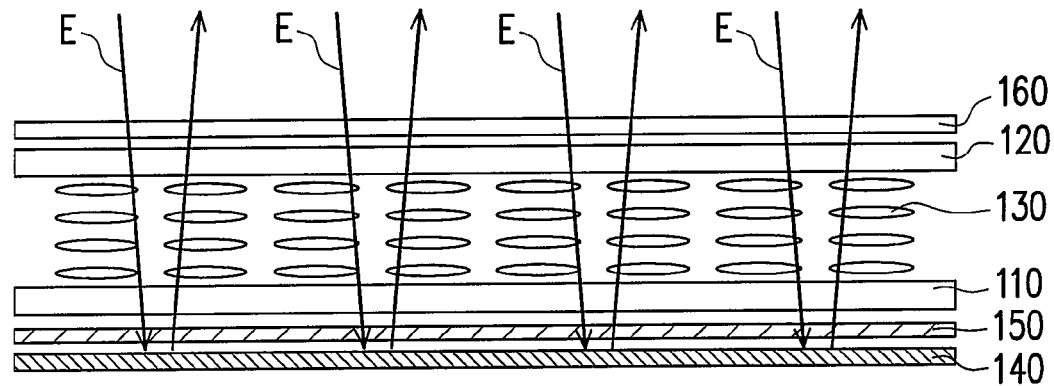
FIG. 1 is a cross-sectional view of a reflective liquid crystal display (LCD) panel according to the first embodiment of the present invention.
Figure 2:
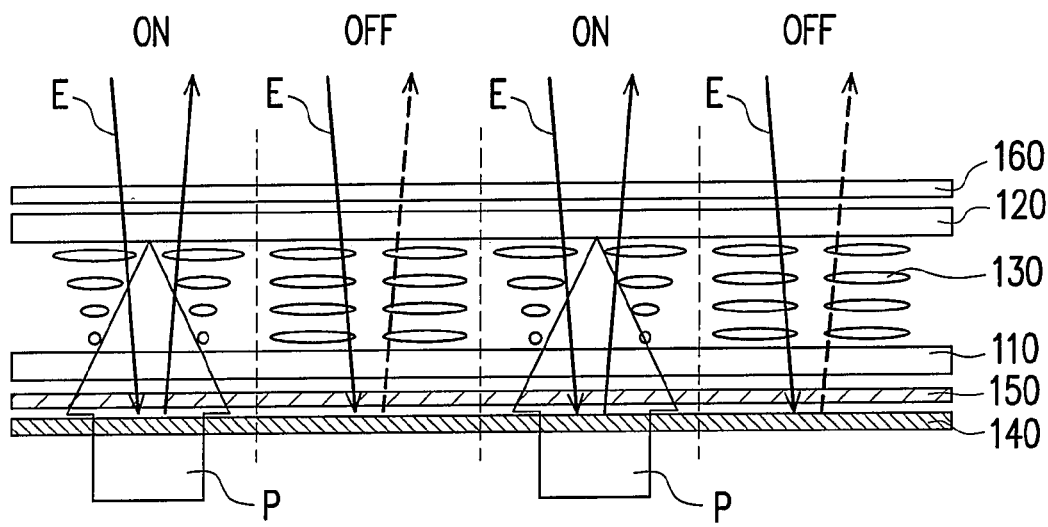
FIG. 2 is a cross-sectional view of the reflective LCD panel in FIG. 1 after being programmed via a polarized light.

FIG. 1 is a cross-sectional view of a reflective liquid crystal display (LCD) panel according to the first embodiment of the present invention, and FIG. 2 is a cross-sectional view of the reflective LCD panel in FIG. 1 after being programmed via a polarized light. Referring to both FIG. 1 and FIG. 2, in the present embodiment, the reflective LCD panel 100 is suitable for performing data programming and/or erasing via a polarized light P. It can be understood from FIG. 1 and FIG. 2 that in the present embodiment, the reflective LCD panel 100 includes a first substrate 110, a second substrate 120, a liquid crystal layer 130, a transflective film 140, a retarder 150, and a polarizer 160. Wherein, the second substrate 120 is disposed over the first substrate 110. The liquid crystal layer 130 is disposed between the first substrate 110 and the second substrate 120, and the liquid crystal layer 130 is doped with an optical aligned material (not shown). The transflective film 140 is disposed below the first substrate 110, and the transflective film 140 allows the polarized light P to pass through so that the orientation of the optical aligned material doped liquid crystal layer 130 can be controlled, and the transflective film 140 reflects the external light source E. The retarder 150 is disposed between the transflective film 140 and the first substrate. In addition, the polarizer 160 is disposed on the second substrate 120.

As shown in FIG. 1 and FIG. 2, in the present embodiment, the first substrate 110 and the second substrate 120 in the reflective LCD panel 100 can be flexible substrate or rigid substrate. For example, the commonly used rigid substrate is glass substrate, quartz substrate, or silicon substrate etc, and the commonly used flexible substrate is plastic substrate.

In the present embodiment, the optical aligned material in the liquid crystal layer 130 is, for example, Azo series photoconductive material such as Azo dye or Azo polymer. In particular, the optical aligned material adopted by the present embodiment can affect the orientation of the liquid crystal molecules in the liquid crystal layer 130 after being irradiated by a polarized light, so that the original homogenous orientation of the liquid crystal layer 130 is changed to twisted nematic mode orientation, mixed-mode twisted nematic orientation, or other orientation mode. It is remarkable that the optical aligned material adopted in the present embodiment can be evenly distributed in the liquid crystal layer 130, in the lower part of the liquid crystal layer 130, or in the upper part of the liquid crystal layer 130. Regardless of evenly or partially distribution in the liquid crystal layer 130, the optical aligned material will change the original orientation of the liquid crystal layer 130 after being irradiated by the polarized light P.

It can be understood from FIG. 1 and FIG. 2 that the retarder 150 in the present embodiment is, for example, attached on the external surface of the first substrate 110, the transflective film 140 is, for example, attached on the retarder 150, and the polarizer 160 is, for example, attached on the external surface of the second substrate 120. Besides, in the present invention, the function of the retarder 150 can be integrated with the function of the first substrate 110; in other words, the retarder 150 can be directly used as the substrate in the present invention. In an exemplary embodiment, the transflective film 140 is, for example, a metal film, dielectric film, or other optical film which allows the polarized light P to pass through.

Referring to FIG. 2, the retarder 150 is a quarter wave plate, and after the optical aligned material in the liquid crystal layer 130 has been irradiated by the polarized light P, the liquid crystal layer 130 changes from homogeneous orientation to twisted nematic mode orientation. Here, the reflective LCD panel 100 can be divided into two regions: "ON" region and "OFF" region. Wherein, "ON" region refers to the region which has been irradiated by the polarized light P, and the "OFF" region refers to the region which has not been irradiated by the polarized light P. Certainly, parameters such as irradiation area and irradiation intensity of the polarized light P can also be controlled so that the reflective LCD panel can have grey scale display function, and the present invention is not limited to only "ON" and "OFF" two regions. The foregoing "ON" region and "OFF" region will be described in detail below with reference to FIG. 3A and FIG. 3B.

Figure 3A:
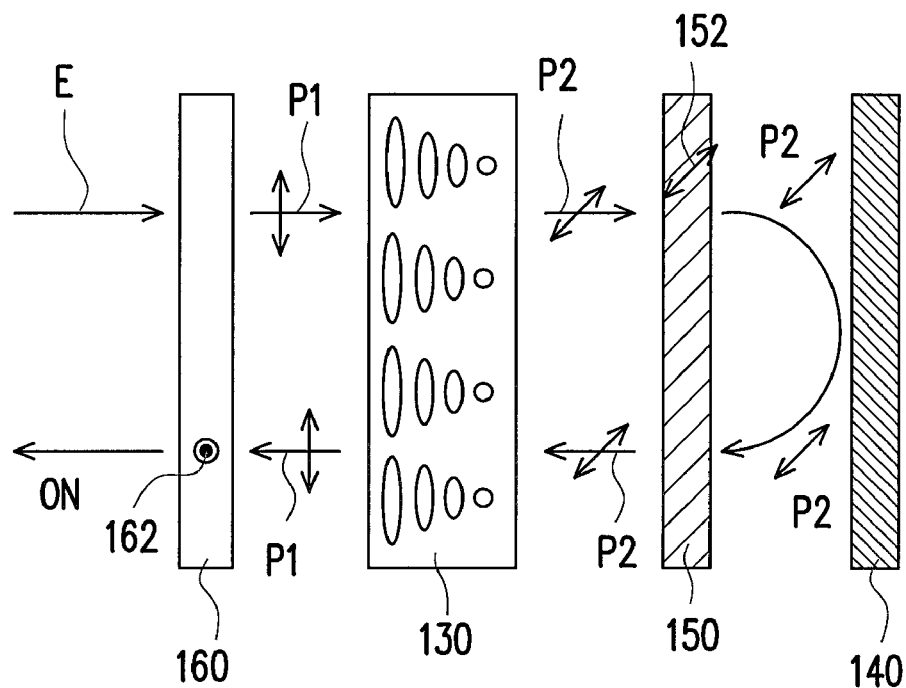
FIGS. 3A and 3B are respectively diagrams of "ON" region and "OFF" region.
Figure 3B:
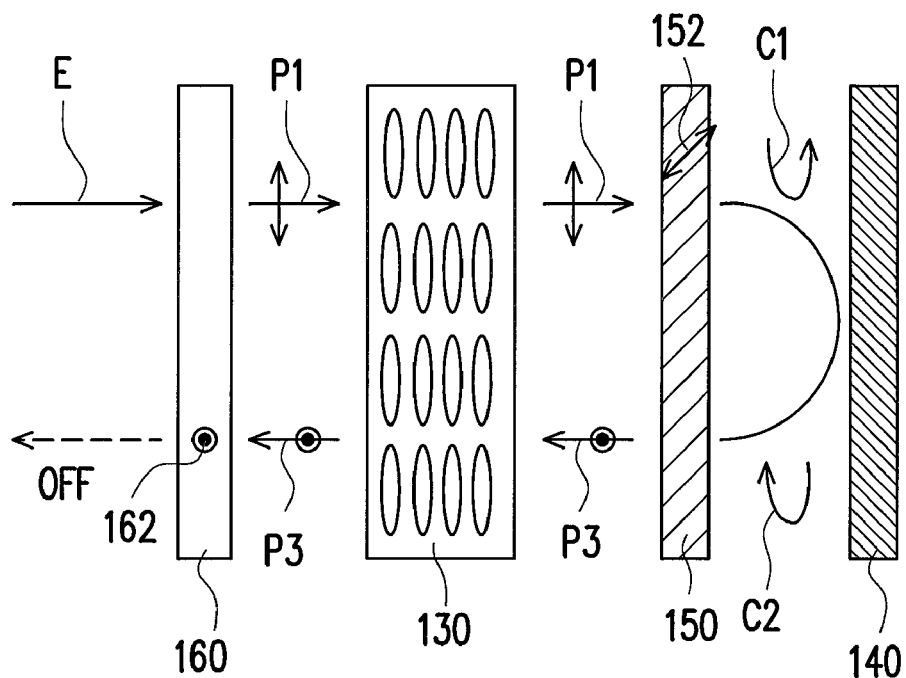

FIGS. 3A and 3B are respectively diagrams of "ON" region and "OFF" region. Referring to both FIG. 3A and FIG. 3B, the retarder 150 in the present embodiment is quarter wave plate, and the retarder 150 has an optical axis 152. In addition, the polarizer 160 in the present embodiment has an absorption axis 162, and the optical axis 152 of the retarder 150 makes an angle of 45° with the absorption axis 162 of the polarizer 160. In the structure described above, data programming to the liquid crystal layer 130 can be performed via a linear polarized light P. Besides, data erasing to the liquid crystal layer 130 can also be performed via a circular polarized light P.

Referring to FIG. 3A again, while the external light E irradiates the reflective LCD panel 100, the external light E through the polarizer 160 is polarized into a linear polarized light P1. The liquid crystal layer 130 represents twisted nematic mode orientation, thus, the linear polarized light P1 through the liquid crystal layer 130 is converted into linear polarized light P2. The polarization direction of the linear polarized light P1 makes an angle of 45° with that of the linear polarized light P2, and this angle is related to the twisting extent of the liquid crystal layer 130. The twisting extent of the liquid crystal layer 130 can be changed by those skilled in the art to obtain the required linear polarized light P2. After that, the linear polarized light P2 passes through the retarder 150 and is reflected by the transflective film 140 so as to pass through the retarder 150 again. The optical axis 152 of the retarder 150 makes an angle of 45° with the absorption axis 162 of the polarizer 160 (i.e., the optical axis 152 of the retarder 150 makes an angle of 45° with the polarization direction of the linear polarized light P2), thus, the linear polarized light P2 through the retarder 150 remains its original polarization direction. Next, the linear polarized light P2 passes through the liquid crystal layer 130 representing twisted nematic mode orientation, and the linear polarized light P2 through the liquid crystal layer 130 is converted into the linear polarized light P1 (the polarization direction is normal to the absorption axis 162 of the polarizer 160). Thus, the linear polarized light P1 can pass through the polarizer 160 without being blocked ("On" status).

Referring to FIG. 3A again, while the external light E irradiates the reflective LCD panel 100, the external light E through the polarizer 160 is polarized into a linear polarized light P1. The liquid crystal layer 130 represents twisted nematic mode orientation, thus, the linear polarized light P1 through the liquid crystal layer 130 is converted into linear polarized light P2. The polarization direction of the linear polarized light P1 makes an angle of 45° with that of the linear polarized light P2, and this angle is related to the twisting extent of the liquid crystal layer 130. The twisting extent of the liquid crystal layer 130 can be changed by those skilled in the art to obtain the required linear polarized light P2. After that, the linear polarized light P2 passes through the retarder 150 and is reflected by the transflective film 140 so as to pass through the retarder 150 again. The optical axis 152 of the retarder 150 makes an angle of 45° with the absorption axis 162 of the polarizer 160 (i.e., the optical axis 152 of the retarder 150 makes an angle of 45° with the polarization direction of the linear polarized light P2), thus, the linear polarized light P2 through the retarder 150 remains its original polarization direction. Next, the linear polarized light P2 passes through the liquid crystal layer 130 representing twisted nematic mode orientation, and the linear polarized light P2 through the liquid crystal layer 130 is converted into the linear polarized light P1 (the polarization direction is normal to the absorption axis 162 of the polarizer 160). Thus, the linear polarized light P1 can pass through the polarizer 160 without being blocked ("ON" status).

Second Embodiment

Figure 4:
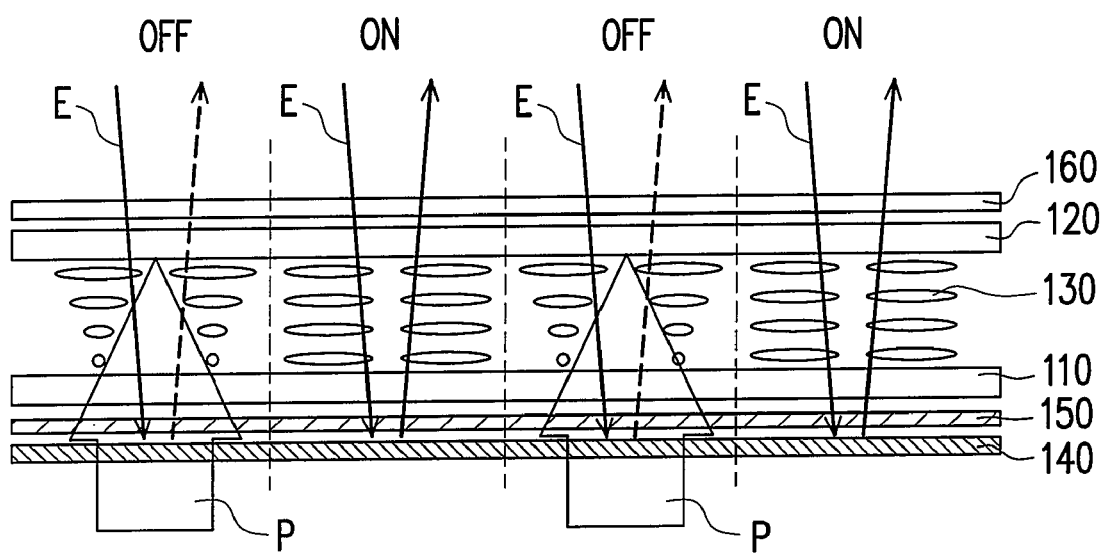
FIG. 4 is a cross-sectional view of a reflective LCD panel after being programmed via a polarized light according to the second embodiment of the present invention.

FIG. 4 is a cross-sectional view of a reflective LCD panel after being programmed via a polarized light according to the second embodiment of the present invention. Referring to FIG. 4, the reflective LCD panel 200 in the present embodiment is similar to the reflective LCD panel 100 in the first embodiment, and the main difference is that the optical axis 152 of the retarder 150 in the present embodiment makes an angle of 90° with the absorption axis 162 of the polarizer 160.

Figure 5A:
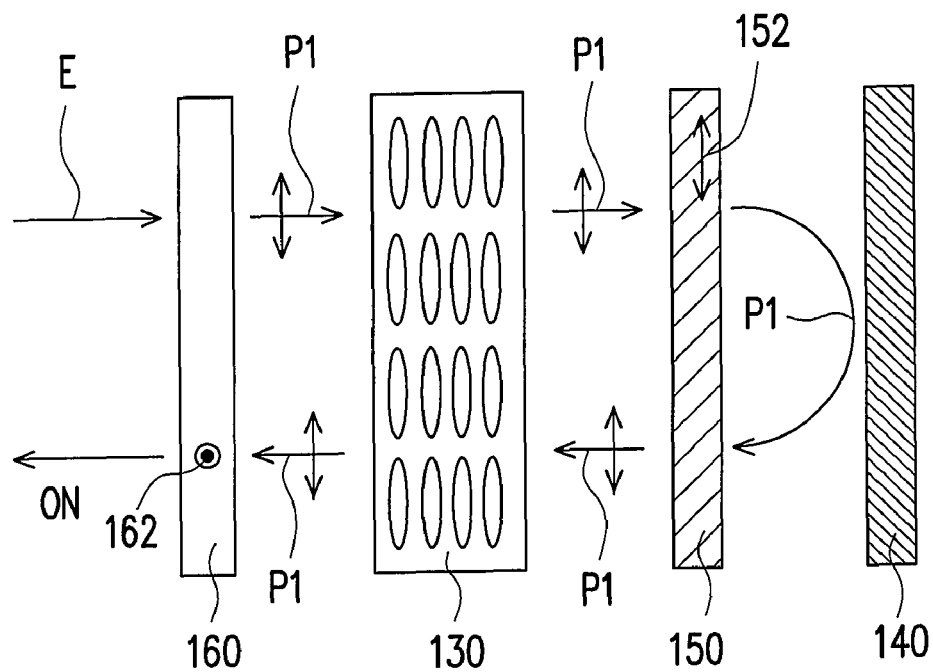
FIGS. 5A and 5B are respectively diagrams of "ON" region and "OFF" region.
Figure 5B:
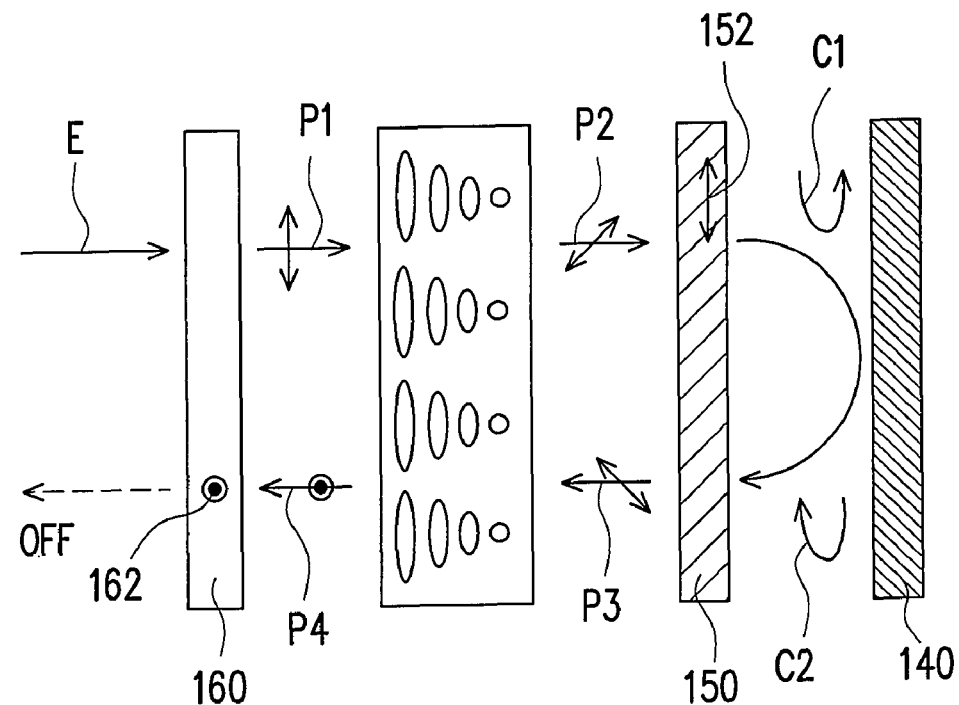

FIGS. 5A and 5B are respectively diagrams of "ON" region and "OFF" region. Referring to FIG. 5A, while the external light E irradiates the reflective LCD panel 200, the external light E through the polarizer 160 is polarized into a linear polarized light P1. The liquid crystal layer 130 represents homogeneous orientation, thus, the linear polarized light P1 through the liquid crystal layer 130 remains its original polarization direction. After that, the linear polarized light P1 passes through the retarder 150 and is reflected by the transflective film 140 so as to pass through the retarder 150 again. The optical axis 152 of the retarder 150 is parallel to the polarized light P1, thus, the linear polarized light P1 remains its original polarization direction after passing through the retarder 150 and being reflected by the transflective film 140. Next, the linear polarized light P1 passes through the liquid crystal layer 130 in homogeneous orientation, and the linear polarized light P1 through the liquid crystal layer 130 remains its original polarization direction. Here, the polarization direction of the linear polarized light P1 is normal to the absorption axis 162 of the polarizer 160, thus, the linear polarized light P1 can pass through the polarizer 160 ("ON" status).

Referring to FIG. 5B, while the external light E irradiates the reflective LCD panel 200, the external light E through the polarizer 160 is polarized into a linear polarized light P1. The liquid crystal layer 130 represents twisted nematic mode orientation, thus, the linear polarized light P1 through the liquid crystal layer 130 is converted into a linear polarized light P2, and the polarization direction of the linear polarized light P1 makes an angle of 450 with that of the linear polarized light P2. This angle is related to the twisting extent of the liquid crystal layer 130, and the twisting extent of the liquid crystal layer 130 can be changed by those skilled in the art so as to obtain the required linear polarized light P2. After that, the linear polarized light P2 passes through the retarder 150 and is reflected by the transflective film 140 so as to pass through the retarder 150 again. The optical axis 152 of the retarder 150 makes an angle of about 90° with the absorption axis 162 of the polarizer 160 (i.e. the optical axis 152 of the retarder 150 makes an angle of 45° with the polarization direction of the linear polarized light P2), thus, the linear polarized light P2 through the retarder 150 becomes a circular polarized light C1, and the circular polarized light C1 becomes a circular polarized light C2 after being reflected by the transflective film 140, and the circular polarized light C2 through the retarder 150 is converted into the linear polarized light P3. Next, the linear polarized light P2 passes through the liquid crystal layer 130 representing twisted nematic mode orientation, and the linear polarized light P3 through the liquid crystal layer 130 is converted into a linear polarized light P4 (the polarization direction is parallel to the absorption axis 162 of the polarizer 160). Thus, the linear polarized light P1 cannot pass through the polarizer 160 ("OFF" status).

Third Embodiment

Figure 6:
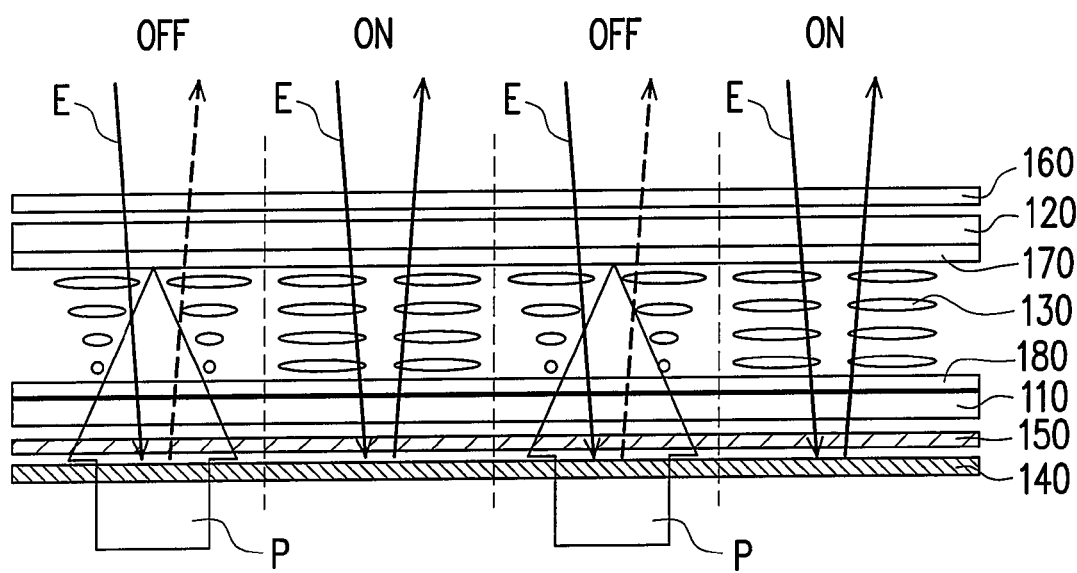
FIG. 6 is a cross-sectional view of a reflective LCD panel according to the third embodiment of the present invention.

FIG. 6 is a cross-sectional view of a reflective LCD panel according to the third embodiment of the present invention. Referring to FIG. 6, the reflective LCD panel 300 in the present embodiment is similar to the reflective LCD panel 100 of the first embodiment, and the main difference is that the reflective LCD panel 300 in the present embodiment further includes an upper alignment layer 170. Referring to FIG. 6, in the present embodiment, the upper alignment layer 170 is disposed on the second substrate 120 and between the second substrate 120 and the liquid crystal layer 130. In particular, in the present embodiment, the upper alignment layer 170 is disposed on the internal surface of the second substrate 120. Besides, the reflective LCD panel 300 in the present embodiment may further include a polymer layer 180 disposed on the first substrate 110 and between the first substrate 110 and the liquid crystal layer 130. In particular, the polymer layer 180 is disposed on the internal surface of the first substrate 110.

Particularly note that the polymer layer 180 of the present embodiment may be a film which has not been aligned, or a lower alignment layer which has been lightly aligned; that is, the aligning capability of the lightly aligned polymer layer 180 (lower alignment layer) to the liquid crystal layer 130 is smaller than that of the upper alignment layer 170 to the liquid crystal layer 130.

The reflective LCD panel in the present invention has advantages such as simple manufacturing process, low cost, and lower power consumption etc, thus, the reflective LCD panel in the present invention can be quickly applied to electronic products such as paper, electronic kanban, and smart card etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A reflective liquid crystal display panel comprising:
   a first substrate;
   a second substrate, disposed over the first substrate;
   a liquid crystal layer, disposed between the first substrate and the second substrate, wherein the liquid crystal layer is doped with an optical aligned material, an orientation of the optical aligned material doped liquid crystal layer is capable of being changed by a linear polarized light to show an image, and the orientation of the optical aligned material doped liquid crystal layer is capable of being restored by a circular polarized light to erase the image;
   a transflective film, disposed below the first substrate, wherein the transflective film allows the polarized light to pass through, and also for reflecting an external light;
   a retarder, disposed between the transflective film and the first substrate; and
   a polarizer, disposed on the second substrate, wherein the retarder has an optical axis, the polarizer has an absorption axis, and the optical axis makes an angle of 45° or an angle of 90° with the absorption axis.

2. The reflective liquid crystal display panel as claimed in claim 1, wherein external light reflected by the transflective film passes through the polarizer after the liquid crystal layer is irradiated by the linear polarized light.

3. The reflective liquid crystal display panel as claimed in claim 1, wherein the first substrate is a flexible substrate or a rigid substrate.

4. The reflective liquid crystal display panel as claimed in claim 1, wherein the second substrate is a flexible substrate or a rigid substrate.

5. The reflective liquid crystal display panel as claimed in claim 1, wherein the optical aligned material is Azo dye or Azo polymer.

6. The reflective liquid crystal display panel as claimed in claim 1, wherein the optical aligned material is evenly distributed in the liquid crystal layer.

7. The reflective liquid crystal display panel as claimed in claim 1, wherein the optical aligned material is distributed in a lower part of the liquid crystal layer.

8. The reflective liquid crystal display panel as claimed in claim 1, wherein the optical aligned material is distributed in an upper part of the liquid crystal layer.

9. The reflective liquid crystal display panel as claimed in claim 1, wherein the liquid crystal layer represents twisted nematic mode orientation after being irradiated by the polarized light.

10. The reflective liquid crystal display panel as claimed in claim 1, wherein the retarder is a quarter wave plate.

11. The reflective liquid crystal display panel as claimed in claim 1, further comprising an upper alignment layer, wherein the upper alignment layer is disposed on the second substrate and between the second substrate and the liquid crystal layer.

12. The reflective liquid crystal display panel as claimed in claim 11, further comprising a polymer layer, wherein the polymer layer is disposed on the first substrate and between the first substrate and the liquid crystal layer.

13. The reflective liquid crystal display panel as claimed in claim 12, wherein the polymer layer is a lower alignment layer, and an aligning capability of the lower alignment layer to the liquid crystal layer is smaller than an aligning capability of the upper alignment layer to the liquid crystal layer.

14. The reflective liquid crystal display panel as claimed in claim 12, wherein the first substrate has no electrode disposed thereon and the second substrate has no electrode disposed thereon.

15. The reflective liquid crystal display panel as claimed in claim 1, wherein the external light reflected by the transflective film is blocked by the polarizer after the liquid crystal layer is irradiated by the circular polarized light.

16. A reflective liquid crystal display panel comprising:
    a first substrate;
    a second substrate, disposed over the first substrate;
    a liquid crystal layer, disposed between the first substrate and the second substrate, wherein the liquid crystal layer is doped with an optical aligned material, an orientation of the optical aligned material doped liquid crystal layer is capable of being changed by a linear polarized light to show an image, and the orientation of the optical aligned material doped liquid crystal layer is capable of being restored by a circular polarized light to erase the image;
    a transflective film, disposed below the first substrate, wherein the transflective film allows the polarized light to pass through, and also for reflecting an external light;
    a retarder, disposed between the transflective film and the first substrate; and
    a polarizer, disposed on the second substrate.

17. The reflective liquid crystal display panel as claimed in claim 16, wherein the optical aligned material is Azo dye or Azo polymer.

18. The reflective liquid crystal display panel as claimed in claim 16, wherein the liquid crystal layer represents twisted nematic mode orientation after being irradiated by the polarized light.

19. The reflective liquid crystal display panel as claimed in claim 16, wherein the retarder is a quarter wave plate.

* * * * *